E. BLAKESLEE.
MESS KIT.
No. 46,210.                    Patented Feb. 7, 1865.
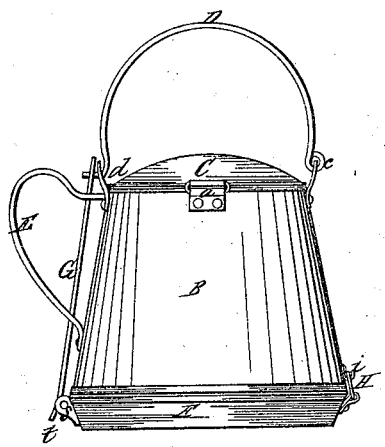
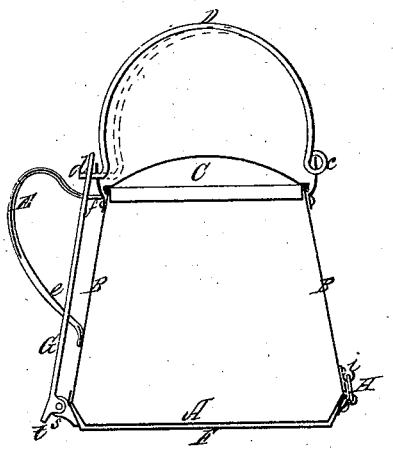
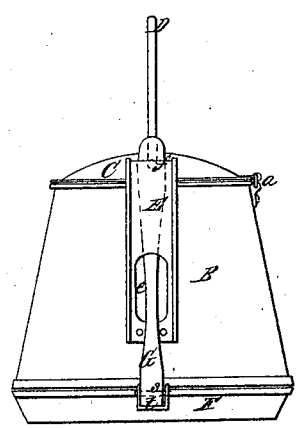
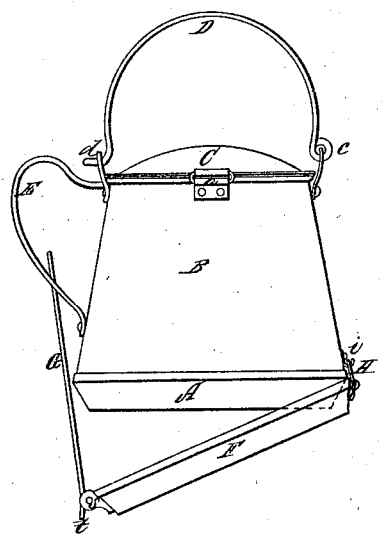
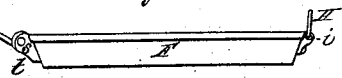
Witnesses:
Rufus Lanford
John E. Earle
Inventor:
E. Blakeslee

UNITED STATES PATENT OFFICE.

ERASTUS BLAKESLEE, OF NEW HAVEN, CONNECTICUT.

IMPROVED MESS KIT.

Specification forming part of Letters Patent No. 46,210, dated February 7, 1865.

*To all whom it may concern:*

Be it known that I, ERASTUS BLAKESLEE, of New Haven, in the county of New Haven and State of Connecticut, have invented a new and useful Improvement in Soldiers' Mess-Kits; and I do hereby declare the following to be a full, clear, and exact description of the same, when taken in connection with the accompanying drawings and the letters of reference marked thereon, and which said drawings constitute part of this specification, and represent, in—

Figure 1, a side view; Fig. 2, a vertical central section; Fig. 3, a side view turned one-quarter from the position in Fig. 1; Fig. 4, the manner of attaching and detaching the pan from the kettle, and in Fig. 5 the pan detached as ready for use.

Similar letters indicate corresponding parts in the several figures.

My invention relates to an improvement in soldiers' mess-kits whereby the two principal articles—the coffee-kettle and frying-pan—are combined and locked together, so as to form, so far as transportation is concerned, but one piece; and it consists in constructing the pan and kettle so that they may be secured together, the pan forming a second bottom to the kettle when not wanted for use, and not adding materially to the bulk of the kit.

To enable those skilled to construct and use my improved kit, I will proceed to fully describe the same, as illustrated in the accompanying drawings.

A is the bottom of the kettle, formed as seen in Fig. 2, which is best done by "striking up," in dies prepared for the purpose, the said bottom. The cylinder B, forming the side of the kettle, is united in the usual manner for similar work, the top closed by a lid, C, hinged to the kettle at *a*, as usual for similar kettles, the whole furnished with a bail, D, one end, *c*, secured in an ear on the kettle in the usual manner, the other end, *d*, in a similar ear upon the opposite side, but so that it may be withdrawn therefrom, as seen in red, Fig. 2, for the purpose hereinafter shown.

E is the handle, formed and secured to the kettle upon that side where the bail is arranged to be withdrawn, as seen in Figs. 1 and 2, in the usual manner, except two openings, *e f*, in the handle, (seen in Figs. 2 and 3,) and for the purpose hereinafter shown.

F is the frying-pan, formed of sheet metal "struck up" in dies prepared for the purpose; G, the handle, hinged to the pan at *s*, with a stop, *t*, to prevent the handle from dropping too low, as seen in Fig. 5. A ring or eye, H, is attached to the opposite side of the pan. A hook, *i*, is placed upon the side of the kettle, onto which place the ring H, as seen in Fig. 4, turn up the handle G, passing it through the opening *e* in the handle of the kettle, as also shown in Fig. 4, thence up through the upper opening, *f*, bringing the pan close up to the bottom of the kettle, as seen in Figs. 1, 2, and 3, springing the bail D, as in red, Fig. 2, so as to allow the handle of the pan to pass it, and, when up to its place, as in Fig. 2, if permitted, the end *d* of the bail will enter a hole in the handle of the pan made for the purpose, as seen in Fig. 2, and there hold it securely, and thus it becomes as a part of the kettle, and the kettle may be used with the pan attached with no more inconvenience than if it were not so attached, and with this advantage, that the pan will protect the bottom of the kettle. When the pan is wanted separately from the kettle, withdraw the bail, as in red, Fig. 2, and the pan may be easily removed from the kettle, the handle dropped down, as in Fig. 5, and it is ready for use.

Other articles to complete the kit—as cups, spoons, forks, &c.—may be placed in the kettle, thus forming a simple, cheap, and compact kit for the comfort and convenience of the soldier.

If desirable, the pan may be constructed as a gridiron, and attached in like manner, therefore by the use of the word "frying-pan" I wish to be understood as including all similar utensils.

Having therefore fully described my invention, what I claim as new and useful, and desire to secure by Letters Patent, is—

Attaching the pan to the kettle in the manner and for the purpose substantially as herein set forth and described.

E. BLAKESLEE.

Witnesses:
RUFUS SANFORD,
JOHN E. EARLE.